(12) United States Patent  (10) Patent No.: US 9,712,877 B2
Jeong  (45) Date of Patent: Jul. 18, 2017

(54) CONTENTS PLAYBACK SYSTEM BASED ON DYNAMIC LAYER

(71) Applicant: NEWIN INC., Seoul (KR)

(72) Inventor: Deok-hwan Jeong, Incheon (KR)

(73) Assignee: NEWIN INC., Seoul (KR)

( * ) Notice: Subject to any disclaimer, the term of this patent is extended or adjusted under 35 U.S.C. 154(b) by 0 days.

(21) Appl. No.: 15/045,176

(22) Filed: Feb. 16, 2016

(65) Prior Publication Data
US 2016/0165311 A1 Jun. 9, 2016

Related U.S. Application Data

(63) Continuation of application No. PCT/KR2014/007353, filed on Aug. 8, 2014.

(30) Foreign Application Priority Data

Aug. 16, 2013 (KR) .................. 10-2013-0097051

(51) Int. Cl.
H04N 5/775 (2006.01)
H04N 9/80 (2006.01)
(Continued)

(52) U.S. Cl.
CPC ..... *H04N 21/47217* (2013.01); *G11B 27/105* (2013.01); *G11B 27/34* (2013.01);
(Continued)

(58) Field of Classification Search
USPC ........................................ 386/230, 239–248
See application file for complete search history.

(56) References Cited

U.S. PATENT DOCUMENTS

2008/0111822 A1* 5/2008 Horowitz ........... H04N 21/8126
345/530
2011/0191677 A1* 8/2011 Morris ..................... G06F 3/00
715/716
(Continued)

FOREIGN PATENT DOCUMENTS

KR 10-2008-0061710 A 7/2008
KR 10-2009-0034665 A 4/2009
(Continued)

OTHER PUBLICATIONS

J.Mugen, "iOS 7—Quick Look on iPhone 5," youtube, Jun. 10, 2013. <URL:http://www.youtube.com/watch?v=272Kp0Ggbo0>.
(Continued)

*Primary Examiner* — Hung Dang
(74) *Attorney, Agent, or Firm* — Hauptman Ham, LLP

(57) ABSTRACT

The present disclosure relates to a contents playback system based on a dynamic layer, which is implemented in a mobile device for playing contents on the basis of a dynamic layer, the contents playback system including at least: a first display unit for outputting a first content list; and a second display unit which is disposed while overlapping the first display unit and displays information on currently played playback contents, wherein the second display unit comprises a progress unit for representing a progress state and a display unit for displaying a screen of the playback contents, and the mode of the second display unit varies to one of a first mode corresponding to a deactivated state and a second mode corresponding to an activated state.

7 Claims, 5 Drawing Sheets

(51) Int. Cl.
- *G06F 3/00* (2006.01)
- *G06F 3/048* (2013.01)
- *H04N 21/472* (2011.01)
- *G11B 27/10* (2006.01)
- *G11B 27/34* (2006.01)
- *H04N 21/41* (2011.01)
- *H04N 21/433* (2011.01)
- *H04N 21/435* (2011.01)
- *H04N 21/431* (2011.01)
- *H04N 21/432* (2011.01)
- *H04N 21/443* (2011.01)

(52) U.S. Cl.
CPC ....... *H04N 21/4122* (2013.01); *H04N 21/435* (2013.01); *H04N 21/4312* (2013.01); *H04N 21/4325* (2013.01); *H04N 21/4332* (2013.01); *H04N 21/4438* (2013.01)

(56) References Cited

U.S. PATENT DOCUMENTS

2013/0318429 A1* 11/2013 Dantas ............... G06F 3/048
    715/234
2015/0046812 A1* 2/2015 Darby ............... G06Q 30/0277
    715/716

FOREIGN PATENT DOCUMENTS

| KR | 10-2013-0048526 A | 5/2013 |
| KR | 10-1265464 B1 | 5/2013 |

OTHER PUBLICATIONS

Korean Office Action for corresponding Korean Patent Application No. 10-2013-0097051 issued on Aug. 27, 2014.
International Search Report mailed Aug. 26, 2014 for PCT/KR2014/007353.

* cited by examiner

CONTENTS PLAYBACK SYSTEM BASED ON DYNAMIC LAYER

CROSS-REFERENCE TO RELATED APPLICATIONS

The present application is a continuation of International Patent Application No. PCT/KR2014/007353, filed Aug. 8, 2014, which is based upon and claims the benefit of priority to Korea Patent Application No. 10-2013-0097051, filed on Aug. 16, 2013. The disclosures of the above-listed applications are hereby incorporated by reference herein in their entirety.

TECHNICAL FIELD

The disclosure related to a contents playback system based on a dynamic layer, and more particularly, to the contents playback system based on the dynamic layer which is capable of searching a content list, with information of playback content displayed while playing content of a content list.

RELATED ART

With the development of electronic technologies, various types of mobile devices have been developed and supplied.

A smartphone which provides various application services beyond a level of services provided in the conventional mobile phone has been spread rapidly with sensational popularity.

As such, contents provided in the mobile device become more and more diverse as functions of the mobile device are diversified.

Such contents are directly downloaded to the mobile device through the Internet or are separately stored and played.

Meanwhile, when wanting to search for other contents while playing content stored in a conventional mobile device or the like, it may be possible to search for other contents by opening a new content list window after minimizing the content being played so as to become invisible, by opening a new content list window after ending the content being played, or by switching to an initial menu screen window.

Therefore, in the conventional mobile device, it is inconvenient and complex to search for other contents, with information of the playback content displayed while playing content of a content list, thereby reducing user convenience.

SUMMARY

An aspect of the present disclosure is to provide a contents playback system based on a dynamic layer which includes a first display unit configured to output a first content list, the first display unit is implemented in the mobile device which is based on the dynamic layer and plays a content, and a second display unit configured to display information of playback content being currently played, the second display unit is disposed to be overlapped on the first display unit. In some embodiments, the second display unit includes a progress unit configured to represent a progress state and a display unit configured to display a screen for the playback content, and a mode of the second display unit may be changed to one of a first mode corresponding to a deactivated state and a second mode corresponding to an activated state.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Below, embodiments of the inventive concept will be more fully described with reference to accompanying drawings.

Prior to description, a contents playback system based on a dynamic layer according to an embodiment of the inventive concept may be independently driven at the local of a device. However, the scope and spirit of the inventive concept may not be limited thereto. For example, it may be noted that the contents playback system is able to be driven in a manner of streaming content by accessing a content server, a cloud server, or the like through a network, such as Internet. The contents playback system based on the dynamic layer according to an embodiment of the inventive concept may be applied to the mobile device which is based on the dynamic layer and plays content, for example, a mobile device which includes a display area smaller than or equal to a specific area, or a mobile device which includes a touch screen panel.

Figure 1:
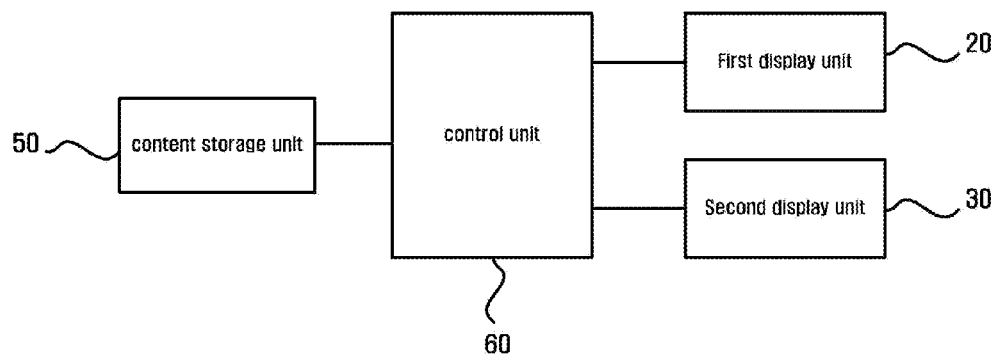
FIG. 1 is a block diagram illustrating a contents playback system based on a dynamic layer, according to some embodiment of the inventive concept.

FIG. 1 is a block diagram illustrating a contents playback system based on a dynamic layer, according to an embodiment of the inventive concept.

As illustrated in FIG. 1, the contents playback system based on the dynamic layer according to an embodiment of the inventive concept may include a first display unit 20 which outputs a first content list 10, a second display unit 30 which is disposed to be overlapped on the first display unit 20 and displays information of playback content currently being played, a content storage unit 50 which stores content to be played, and a control unit 60 which performs control to display the content stored in the content storage unit 50 on the first display unit 20 and the second display unit 30.

The above system and/or units, in some embodiments, include by one or more micro-processors or Integrated Circuits (ICs) of one or more computer systems. The one or more processors or Application-Specific Integrated Circuits (ASICs) are hardwired and/or programmed to perform the described example operations. Further, the described example operations are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to an embodiment of the inventive concept, a display area of the first display unit 20 may have a size corresponding to the whole display screen. However, the scope and spirit of the inventive concept may not be limited thereto. For example, the first display unit 20 may be restrictively displayed on a portion of the display screen.

The second display unit 30 may include a progress unit 31 for representing a progress state of the playback content being currently played and a display unit 41 for displaying a screen about the playback content. A display area of the second display unit 30 may be set to have a size which is smaller than the first display unit 20. However, the scope and spirit of the inventive concept may not be limited thereto. For example, the area of the second display unit 30 may be larger than that of the first display unit 20.

The progress unit 31 may include a progress bar 31 which indicates a current position of the playback content being played and operation icons 35 for operations, such as play, stop, fast forward, and rewind.

According to an embodiment of the inventive concept, the playback content may be video content, and the display unit 41 may play the video content. However, the scope and spirit of the inventive concept may not be limited thereto. For example, the playback contents may play a variety of contents like music, picture or text.

The second display unit 30 may change to either a first mode in a deactivated state or a second mode in an activated state. The first mode corresponding to the deactivated state may refer to a state in which only a tag 45 of the second display unit 30 to be described later is displayed on the first display unit 20. The second mode corresponding to the activated state may refer to a state in which the second display unit 30 is displayed on the first display unit 20.

Meanwhile, when a user's touch is detected on the first display unit 20 while the second display unit 30 is in the second mode corresponding to the activated state, a mode of the second display unit 30 may be changed to a third mode corresponding to an unfocused state.

Figure 4:
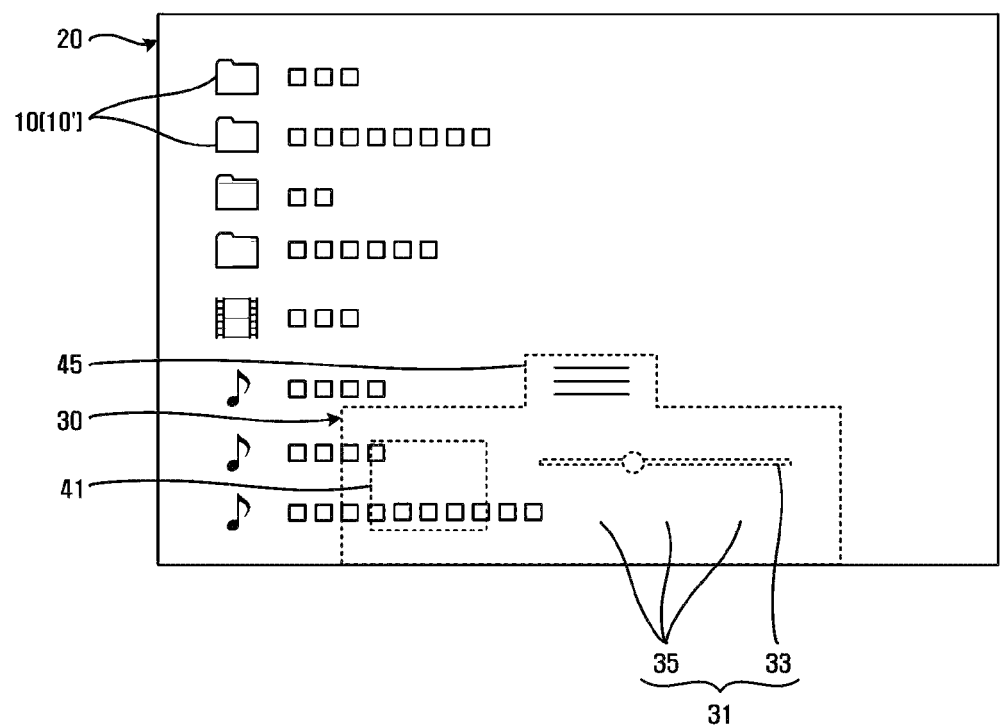
FIG. 4 is a diagram illustrating a first display unit, on which a second display unit is in an unfocused state, according to some embodiment of the inventive concept.

In the third mode, brightness, chroma or opacity of the second display unit 30 may be decreased. For example, as illustrated in FIG. 4, the second display unit 30 may become dark, blurred, or transparent in the third mode corresponding to the unfocused state.

Figure 5:
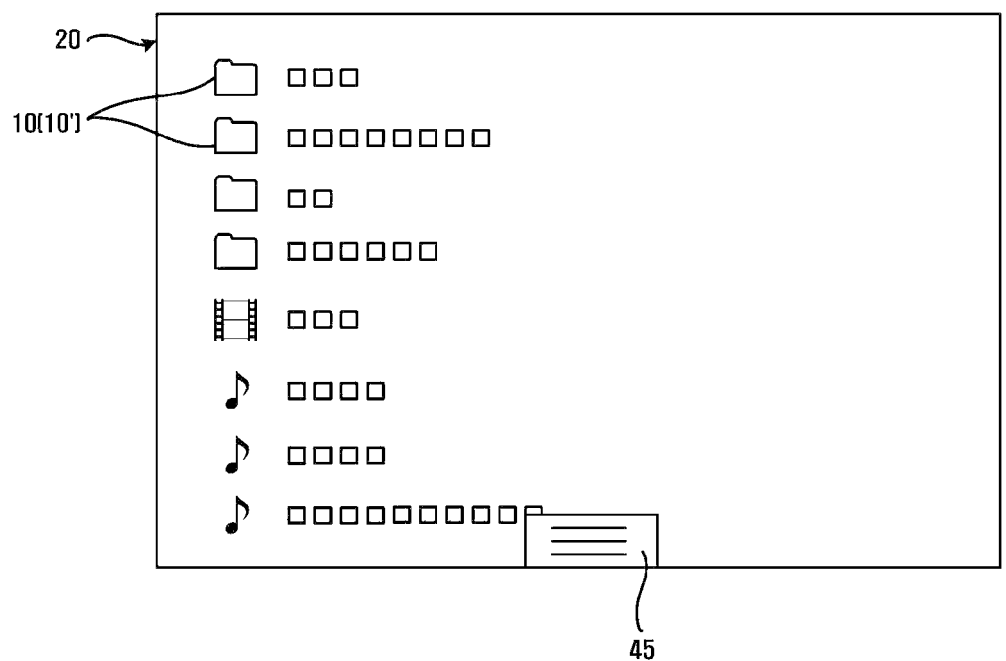
FIG. 5 is a diagram illustrating a first display unit, on which a second display unit is in a deactivated state, according to some embodiment of the inventive concept.

Furthermore, in the first mode, the second display unit 30 may further include, for example, the tag 45 which is displayed on the first display unit 20 with the second display unit 30 deactivated. As illustrated in FIG. 5, in the first mode, the second display unit 30 may display only the tag 45 so as to be overlapped on the first display unit 20. According to an embodiment of the inventive concept, the tag 45 may be displayed to be exposed on a bottom area of the first display unit 20. However, the scope and spirit of the inventive concept may not be limited thereto. For example, the tag 45 may be displayed on a top, left, or right area of the first display unit 20.

Figure 3:
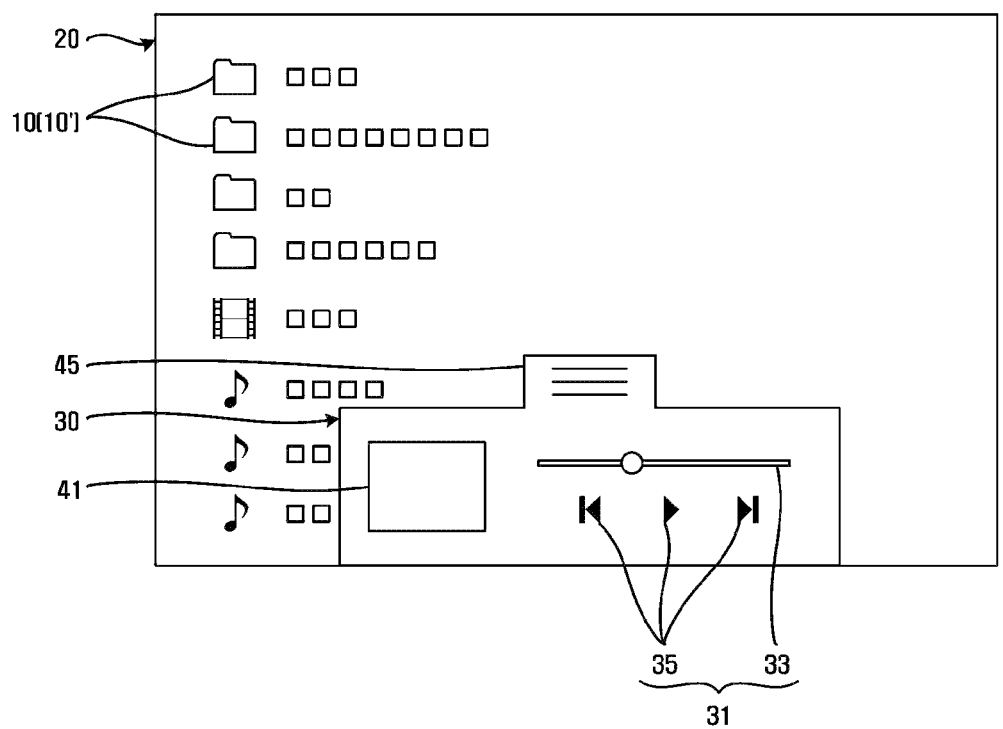
FIG. 3 is a diagram illustrating a first display unit, on which a second display unit is in an activated state, according to some embodiment of the inventive concept.

Meanwhile, when dragging the tag 45 in the direction of the top of the first display unit 20 while only the tag 45 of the second display unit 30 is displayed to be overlapped on the first display unit 20, the mode of the second display unit 30 may be changed to the second mode so as to be overlapped and displayed on the first display unit 20 as illustrated in FIG. 3. An embodiment of the inventive concept is exemplified as the mode of the second display unit 30 is changed to the second mode by dragging the tag 45. However, the scope and spirit of the inventive concept may not be limited thereto. For example, the mode of the second display unit 30 may be changed to the second mode by clicking the tag 45 or by gesture motion.

Figure 2:
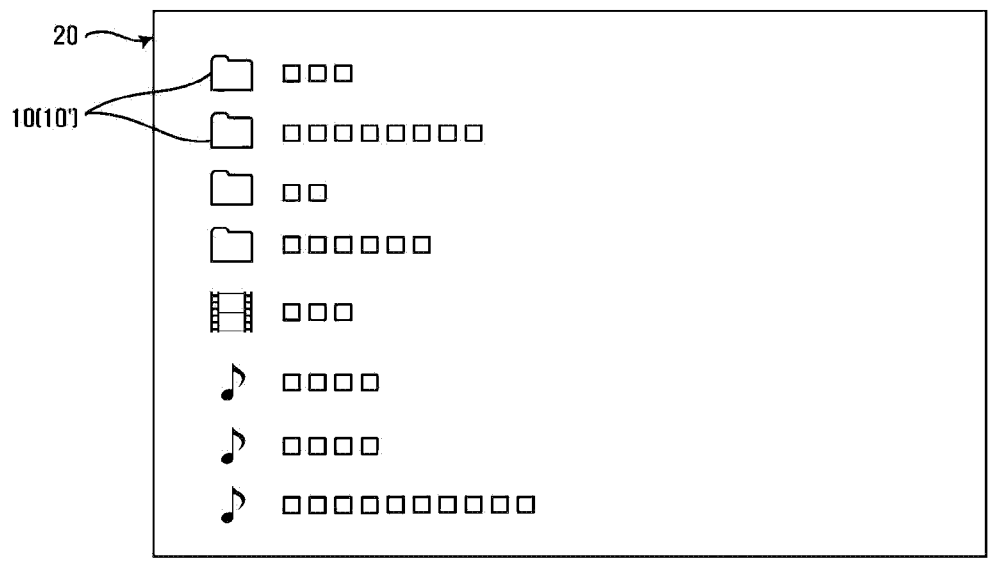
FIG. 2 is a diagram illustrating a first display unit, on which a second display unit is in an invisible state, according to some embodiment of the inventive concept.

When a piece of content is selected from the first and second content lists 10 and 10' which are outputted to the first display unit 20 while the second display unit 30 is in an invisible state as illustrated in FIG. 2, the contents playback system based on the dynamic layer according to an embodiment of the inventive concept may display the second display unit 30 as illustrated in FIG. 3. According to an embodiment of the inventive concept, for descriptive convenience, the content list may be limited to the first and second content lists 10 and 10', but the number of content lists may not be limited thereto.

Furthermore, the contents playback system based on the dynamic layer according to an embodiment of the inventive concept may output the first content list 10 and the second content list 10', which is different from the first content list 10, to the first display unit 20 while the display of the second display unit 30 is maintained.

In the contents playback system based on the dynamic layer according to an embodiment of the inventive concept, when the second display unit 30 is clicked while the second display unit 30 is in the second mode, for example, while the second display unit 30 is in the activated state, the second display unit 30 may be displayed to be maximized. In this case, a size of the second display unit 30 may correspond to that of the first display unit 20.

In another embodiment, when the display unit 41 of the second display unit 30 is clicked while the second display unit is in the second mode, the display unit 41 of the second display unit 30 may be maximized in size so as to correspond to the first display unit 20. Accordingly, the video being played may be watched through the whole display screen.

An operation of the contents playback system based on the dynamic layer according to an embodiment of the inventive concept will be described based on such the configuration.

As illustrated in FIG. 2, when the second display unit 30 is in the invisible state, there may be selected and clicked a piece of content to be played from the content lists 10 and 10' which are outputted on the first display unit 20.

As illustrated in FIG. 3, as the content is clicked, the second display unit 30 on which the video and progress state corresponding to the clicked content are displayed may be displayed to be overlapped on the first display unit 20 and the mode of the second display unit 30 may be changed to the second mode corresponding to the activated state.

Accordingly, the user may enjoy the video through the second display unit 30 which is overlapped on the first display unit 20.

Meanwhile, when the second display unit 30 is clicked, and more preferably, when the display unit 41 of the second display unit 30 is clicked, while the second display unit 30 is disposed to be overlapped on the first display unit, the display unit 41 of the second display unit 30 may be maximized to have a size corresponding to the first display unit 20. Accordingly, the video being played may be watched through the whole display screen.

Below, it will be described how to search for other contents while playing content using the contents playback system based on the dynamic layer according to an embodiment of the inventive concept.

First of all, in an embodiment, when the user touches the first display unit 20, with the second display unit 30 overlapped on the first display unit 20, as illustrated in FIG. 3, the mode of the second display unit 30 may be changed to the third mode corresponding to the unfocused state while the second display unit 30 may become dark, blurred, or transparent. Accordingly, the content lists 10 and 10' may be clearly displayed on the first display unit 20 as illustrated in FIG. 4.

Accordingly, the user may easily search for content from the content lists 10 and 10' displayed on the first display unit 20 in the state where the second display unit 30 is in the unfocused state.

In another embodiment, as illustrated in FIG. 3, when the tag 45 is dragged, for example, in the direction of the bottom area of the first display unit 20 with the second display unit 30 overlapped on the first display unit 20, as illustrated in FIG. 5, there may be performed switching to the first mode corresponding to the deactivated state in which the remaining area of the second display unit 30 other than the tag 45 is not displayed on the first display unit 20 and only the tag 45 is displayed on the bottom area of the first display unit 20.

Accordingly, the user may easily search for content from the content lists 10 and 10' displayed on the first display unit 20, with the second display unit 30 deactivated.

As such, according to an embodiment of the inventive concept, a mode of the second display unit 30 which is disposed to be overlapped on the first display unit 20 which outputs the first content list and displays information of the playback content being played may switch to one of the first mode corresponding to the deactivated state and the second mode corresponding to the activated state, thereby making it possible to easily search for other contents, with information of the playback content displayed while playing content of the content list and increasing user convenience.

Some embodiments of this disclosure provide a contents playback system based on a dynamic layer which is capable of easily searching for content, with information of playback content displayed while playing content of a content list and improving user convenience.

While the inventive concept has been shown and described with reference to various embodiments thereof, it will be understood by those skilled in the art that various changes in form and details may be made therein without departing from the spirit and scope of the inventive concept as defined by the appended claims and their equivalents.

What is claimed is:

1. A contents playback system based on a dynamic layer, the contents playback system implemented in a mobile device comprises a touch screen panel configured to play a content, the contents playback system comprising:
   a first display unit configured to display a first content list; and
   a second display unit configured to display information of a playback content being currently played among the first content list and a plurality of operation icons for controlling playback of the playback content, the second display unit is disposed to be overlapped on the first display unit,
   wherein the second display unit comprises:
   a progress unit configured to display a progress state of the playback content and the plurality of operation icons for controlling playback of the playback content;
   a display unit configured to display a playback screen for the playback content; and
   a tag disposed at one end of the second display unit, and
   wherein a mode of the second display unit is changed to one of a first mode corresponding to a deactivated state, a second mode corresponding to an activated state, and a third mode corresponding to an unfocused state,
   wherein the progress unit and the display unit are not displayed and the tag is displayed to be overlapped on one side of the first display unit in the first mode,
   wherein, when the tag is dragged in a first direction in the first mode, the mode of the second display unit is changed to the second mode in which the second display unit is activated and the progress unit, the display unit and the tag of the second display unit are displayed to be overlapped on the one side of the first display unit,
   wherein, when a user's touch is detected on the first display unit in the second mode, the mode of the second display unit is changed to the third mode in which brightness, chroma or opacity of the second display unit is reduced,
   wherein, when the tag is dragged in a second direction in the second mode, the mode of the second display unit is changed to the first mode in which the second display unit is deactivated, and
   wherein, when the user's touch is detected on the display unit of the second display unit in the second mode, the display unit of the second display unit is displayed in a size corresponding to a size of the first display unit.

2. The contents playback system of claim 1, wherein when the tag is dragged or clicked on the first display unit, the mode of the second display unit is changed to the second mode.

3. The contents playback system of claim 1, wherein, when the content played on the first display unit is selected while the second display unit is in an invisible state, the second display unit becomes visible.

4. The contents playback system of claim 1, wherein while a visible state of the second display unit is maintained, the first content list and a second content list which is different from the first content list are outputted on the first display unit.

5. The contents playback system of claim 1, wherein the playback content is a video content.

6. The contents playback system of claim 5, wherein the display unit is configured to play the video content.

7. The contents playback system of claim 1, wherein when the second display unit is clicked while the second display unit is in the second mode, the second display unit is displayed in a maximized state.

* * * * *